US012329141B1

(12) United States Patent
McMillin

(10) Patent No.: US 12,329,141 B1
(45) Date of Patent: Jun. 17, 2025

(54) MODULAR FISHING ROD HOLSTER

(71) Applicant: Pine 9 Solutions LLC, Nashua, NH (US)

(72) Inventor: Matthew McMillin, Nashua, NH (US)

(73) Assignee: Pine 9 Solutions LLC, Nashua, NH (US)

( * ) Notice: Subject to any disclaimer, the term of this patent is extended or adjusted under 35 U.S.C. 154(b) by 155 days.

(21) Appl. No.: 18/121,726

(22) Filed: Mar. 15, 2023

Related U.S. Application Data

(60) Provisional application No. 63/321,080, filed on Mar. 17, 2022.

(51) Int. Cl.
*A01K 97/10* (2006.01)
(52) U.S. Cl.
CPC .................... *A01K 97/10* (2013.01)
(58) Field of Classification Search
CPC ... A01K 97/10; F16B 9/02; F16B 9/07; F16B 17/008
USPC ........................................... D22/147; 29/453
See application file for complete search history.

(56) References Cited

U.S. PATENT DOCUMENTS

| 1,451,732 | A | | 4/1923 | Hipwood | |
|---|---|---|---|---|---|
| 2,101,174 | A | * | 12/1937 | Grahame | A01K 97/10 224/162 |
| 2,954,909 | A | * | 10/1960 | Miller | A01K 97/10 224/907 |
| D239,668 | S | | 4/1976 | Vanus | |
| 4,011,803 | A | * | 3/1977 | Pfaffinger | F24C 15/2071 454/67 |
| D255,141 | S | | 5/1980 | Clark | |
| D273,969 | S | | 5/1984 | Hitchens | |
| D273,970 | S | | 5/1984 | Hitchens | |
| D279,122 | S | | 6/1985 | Mohel | |
| D295,776 | S | | 5/1988 | Johansen | |
| D318,954 | S | | 8/1991 | Parkhurst | |
| D319,733 | S | | 9/1991 | Braid | |
| 5,044,109 | A | | 9/1991 | Fast | |
| 5,052,146 | A | * | 10/1991 | Resnick | A01K 97/10 43/21.2 |

(Continued)

OTHER PUBLICATIONS

Holster Your Rod, unknown first available date, pine9holsters.com [online], site visited Apr. 14, 2023], Available at URL: https://pine9holsters.com/holster-your-rod/ (Year: 2023) 8 pages.

*Primary Examiner* — Christopher D Hutchens
(74) *Attorney, Agent, or Firm* — Loginov & Associates, PLLC; William A. Loginov

(57) ABSTRACT

This invention provides a modular fishing rod holster arrangement having a backing plate with a plurality of slots located at for removably receiving a semi-cylindrical pipe and a belt clip assembly on each of opposing sides of the backing plate. The backing plate and slots are constructed and arranged to allow the pipe and belt clip assembly to be located on either of opposing sides of the backing plate. The pipe is oriented at an acute angle relative to the vertical so that a handle of a fishing rod can removably reside within the pipe at a forward-facing angle one either the left side or right side of the user. The pipe includes, at a top end thereof, a keyway locking mechanism that rotatably engages and captures the shaft of the reel foot in either a left-sided or right-sided position. The arrangement can be constructed from molded polymer.

15 Claims, 12 Drawing Sheets

(56) References Cited

U.S. PATENT DOCUMENTS

| | | | |
|---|---|---|---|
| D335,031 S | 4/1993 | Resnik | |
| 5,992,717 A * | 11/1999 | Clewes | A01K 97/10 224/584 |
| D616,643 S | 6/2010 | Casper | |
| 9,924,785 B1 * | 3/2018 | Gilmore | A45F 5/021 |
| 10,561,227 B2 * | 2/2020 | Record | A45F 5/02 |
| 11,399,528 B2 * | 8/2022 | Jacobson | A01K 97/10 |
| 2014/0360086 A1 * | 12/2014 | Finlan | A01K 97/10 43/21.2 |
| 2015/0056009 A1 * | 2/2015 | Morris | F16B 21/08 403/326 |
| 2019/0269119 A1 * | 9/2019 | Vandamia | A01K 97/10 |
| 2020/0305404 A1 * | 10/2020 | Jacobson | A01K 97/10 |

\* cited by examiner

MODULAR FISHING ROD HOLSTER

RELATED APPLICATION

This application claims the benefit of U.S. Provisional Application Ser. No. 63/321,080, entitled MODULAR FISHING REEL HOLSTER, filed Mar. 17, 2022, the teachings of which are incorporated herein by reference.

FIELD OF THE INVENTION

This invention relates to fishing rod holsters worn on the user's belt to secure a rod and reel while fishing.

BACKGROUND OF THE INVENTION

Fishing is one of the most popular outdoor pastimes worldwide. Most fishing activities center around use of a fishing rod, which is an elongated, generally tapered flexible shaft with extending from a handle, having a diameter of approximately ¾ to 1½ inches, to small-diameter tip. The rod includes a series of loop-like guides along the length (termed a "blank") to guide a fishing line of desired size between the handle and the tip. The fishing line includes a hook for attaching bait and/or a fly/lure at its end, designed to be cast or dropped into the water to attract and hook a fish. The handle includes a reel seat that removably secured the foot of a reel of appropriate design. The reel is used to pay out and reel in the fishing line based upon operation of a release and a crank handle, respectively. The release can be a button on the rear of the reel (e.g. a spincast reel with an enclosed, spool of fishing line), a clip that selectively engages the spool (e.g. a baitcasting reel), or a spinning bail on the front of the reel, adjacent to an exposed spool holding the fishing line (e.g. a spinning reel), among other types of commercially reel arrangements.

In a casting operation, the user typically releases the line and hook/fly/lure, and allows it to fly away from the rod tip using a whipping action of the rod. The user may hold the rod to maintain the line in a given location in the water, slowly reel the lien in, or may engage in a continuous series of casting actions-simulative of flies, jumping insects, etc. Often the user stands in the water with tall, waterproof boots or waders as he or she fishes. This location, and/or other locations, such as wet a shoreline, may limit the ability of the user to rest his or her pole when not in use, or when simply maintain the bait at a single spot in the water. Thus, users often turn to use of a belt holder/holster to secure the handle of the rod. The holster allows the user the free his or her hands for other activities between casting and reeling sessions. Hence, a holster can be desirable accessory.

However, most holsters are designed to hold the line at an acute angle relative to vertical. This means that the holster may be useful on only one side of the user's body. The one-sided arrangement of most rod holsters poses a significant limitation on the holster's utility.

SUMMARY OF THE INVENTION

This invention overcomes disadvantages of the prior art by providing a modular fishing rod holster arrangement having a backing plate with a plurality of slots located at predetermined positions for removably receiving a semi-cylindrical pipe and a belt clip assembly on each of opposing sides of the backing plate. The backing plate and slots are constructed and arranged to allow the pipe and belt clip assembly to be located on either of opposing sides of the backing plate. The pipe is oriented at an acute angle relative to the vertical (with respect to gravity) so that a handle of a fishing rod can removably reside within the pipe at a forward-facing angle one either the left side or right side of the user. The pipe includes, at a top end thereof, a keyway locking mechanism that rotatably engages and captures the shaft of the reel foot in either a left-sided or right-sided position. The various components of the holster arrangement can be constructed of (e.g. molded), exclusively, a durable polymer, such as polypropylene. The components removably attach to the backing plate slot by tabs that can be flexed into engagement or disengagement, but are maintained in the slots during normal use.

In an illustrative embodiment, a modular holster for a fishing rod includes a backing plate having a plurality of slots in a predetermined arrangement. The backing plate has a first face and an opposing second face. A rod holder with an open top and bottom allows the fishing rod handle to pass therethrough. A belt clip assembly includes belt engaging portions that allow removable attachment to a user's belt. A plurality of tabs on each of the rod holder and the belt clip assembly springingly engage to, and disengage from, respective of the slots so that (a) the rod holder can be removably attached to the first face at a non-vertical, forward-facing angle while the belt clip assembly is removably attached to the second face or (b) the rod holder can be removably attached to the second face at a non-vertical, forward-facing angle while the belt clip assembly is removably attached to the first face. Illustratively, the open top includes a keyway with opposing detents that allow a spinning wheel foot assembly shaft to lock thereinto based upon rotation of the fishing rod relative to the holder. The holder and the belt clip assembly can be constructed from an elastically deformable polymer, and/or the backing plate can be constructed from a polymer. The polymer can be injection-molded polypropylene, among other compounds and formation techniques. Illustratively, the belt clip can constructed from HDPE so as to impart particular durability/performance characteristics to this component. The holder can define a semi-cylindrical shape, and/or can include opposing flattened flanges that engage the backing plate and each carry one of the plurality of tabs. The holder can further include a flared guide flange at a top end thereof. Each tab of the plurality of tabs on the flattened flanges can face upwardly, and two bottom tabs of the plurality of the tabs can be located adjacent to a bottom end of the holder and face in opposing directions. The holder can be constructed and arranged to elastically deform by pinching thereof to move the bottom tabs toward each other. The backing plate can further include optional holes for mounting accessories thereon. The belt clip assembly can include a finger grip structure that enables pinching to cause elastic deformation that moves opposing of the tabs toward each other. The finger grip structure can define a semi-cylindrical structure between flattened bases arranged to engage the backing plate, in which the bases have each of a plurality of tabs mounted thereon. The flattened bases can have, extending therefrom, the belt engaging portions, oriented vertically downward and including flanges for engaging a lower edge of a user's belt.

In a further illustrative embodiment, a method for reversing a wear direction of the modular holster can comprise removing the plurality of tabs on each of the rod holder and the belt clip assembly from each of the plurality of slots on the backing plate relative to a first face of the backing plate, respectively. A facing direction of the backing plate is then reversed so that it can be worn on the user's opposite side.

The plurality of tabs on each of the rod holder and the belt clip assembly are then removed from each of the plurality of slots on the backing plate relative to a second face of the backing plate, opposite the first face, respectively. The removing and/or attaching of the components to the backing plate can comprise elastically deforming the plurality of tabs on each of the rod holder and the belt clip assembly to move between an interfering and non-interfering orientation with respect to the plurality of slots, respectively.

BRIEF DESCRIPTION OF THE DRAWINGS

The invention description below refers to the accompanying drawings, of which.

DETAILED DESCRIPTION

Figure 1:
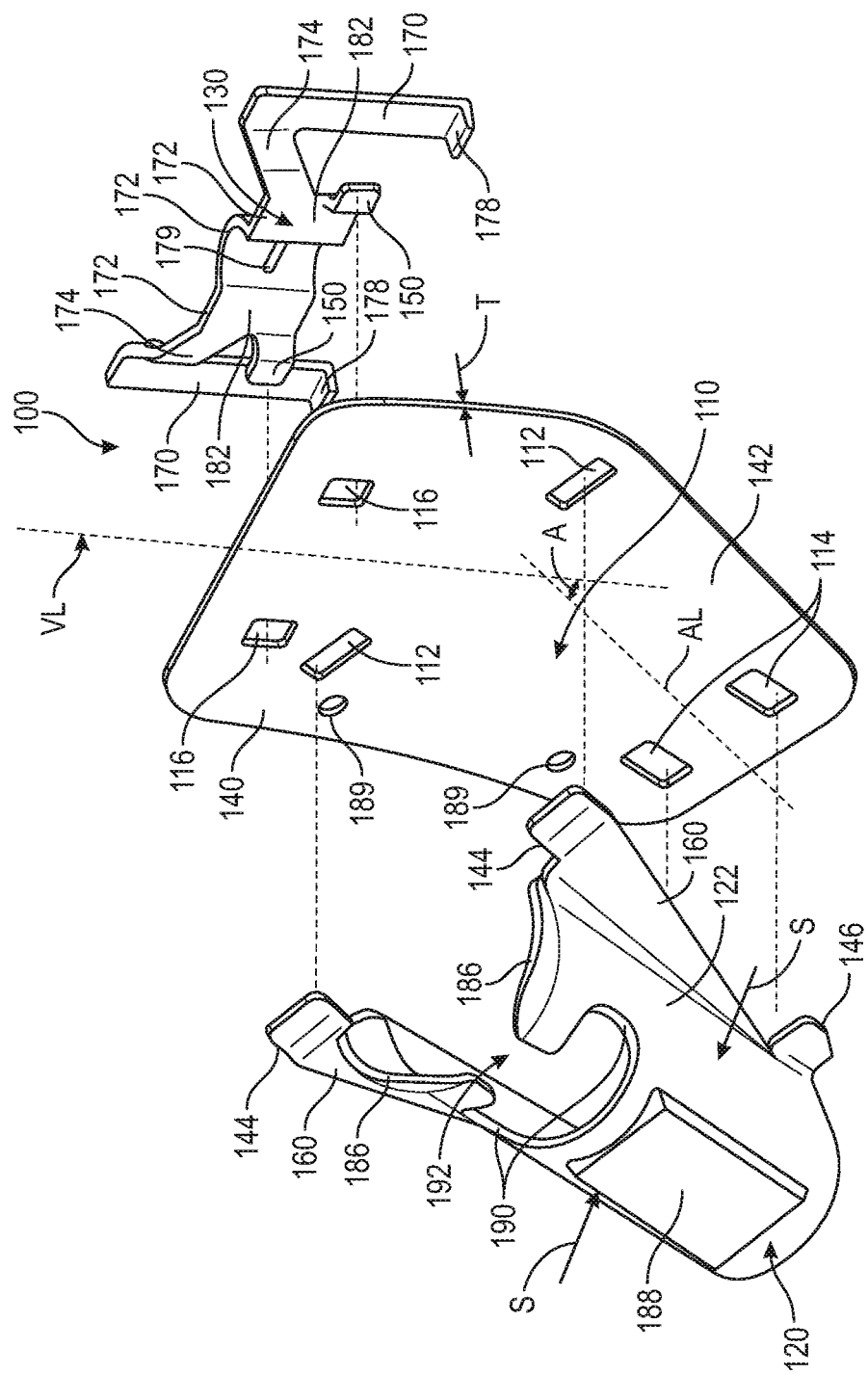
FIG. 1 is an exploded perspective view of a modular fishing rod holster arrangement that can be assembled from three components into each of two alternate orientations for wearing on a user's belt relative to either the right hip or left hip.

FIG. 1 shows a rod holster arrangement 100, divided into its component parts. The arrangement 100 includes a backing plate (or frame) 110 having a series of slots 112, 114 and 116, described further below, which are adapted to receive a removable, a handle holder assembly 120 defining a semi-cylindrical pipe 122 constructed and arranged so that the handle of a fishing rod can slide thereinto and an opposing, belt clip assembly 130. The backing plate 110 defines a relative flat material piece with a thickness T of between approximately 0.05 and 0.2 inch (and more particularly, 0.16 inch). It includes an upper section 140 that is oriented orthogonally to the vertical VL (generally with respect to the user's standing height/gravity) and a lower section 142 that extends (along line of elongation AL) at an acute angle A. The angle A can be between approximately 5 and 25 degrees, and more particularly 25-30 degrees (60-65 degrees from the horizontal, which is parallel with the top of the backing plate 110). The overall height of the backing plate can be in a range of between 7 and 8 inches. The overall width can be between approximately 5-7½ inches (scribing a rectangle that includes the dogleg-angled bottom section).

As shown further in FIGS. 2, 2A, and 3-8, the slots 112 and 114 are adapted to removably receive unitary locking tabs 144 and 146, respectively, on the top and bottom ends of the holder/pipe assembly 120. As depicted, the holder 120 is selectively attached to a given side of the backing plate 110 by inserting the upper tabs 144 into respective slots 116, and thereafter, the lower tabs 146 are inserted horizontally into the respective tabs 114 by elastically deforming (squeezing in direction of opposing arrows S, with the user's fingers) the pipe 122 until the ends of the lower tabs 146 are aligned with slot (114) edges. The tabs 146 are then passed through the slots 114, and the deformation pressure is released, thereby locking all tabs 144 and 146 into respective slots 112 and 114. The holder 120 confronts the plate 110 with a pair of wedge-shaped flanges 160 that reinforce the overall structure of the assembled backing plate 110 and holder 120.

Figure 4:
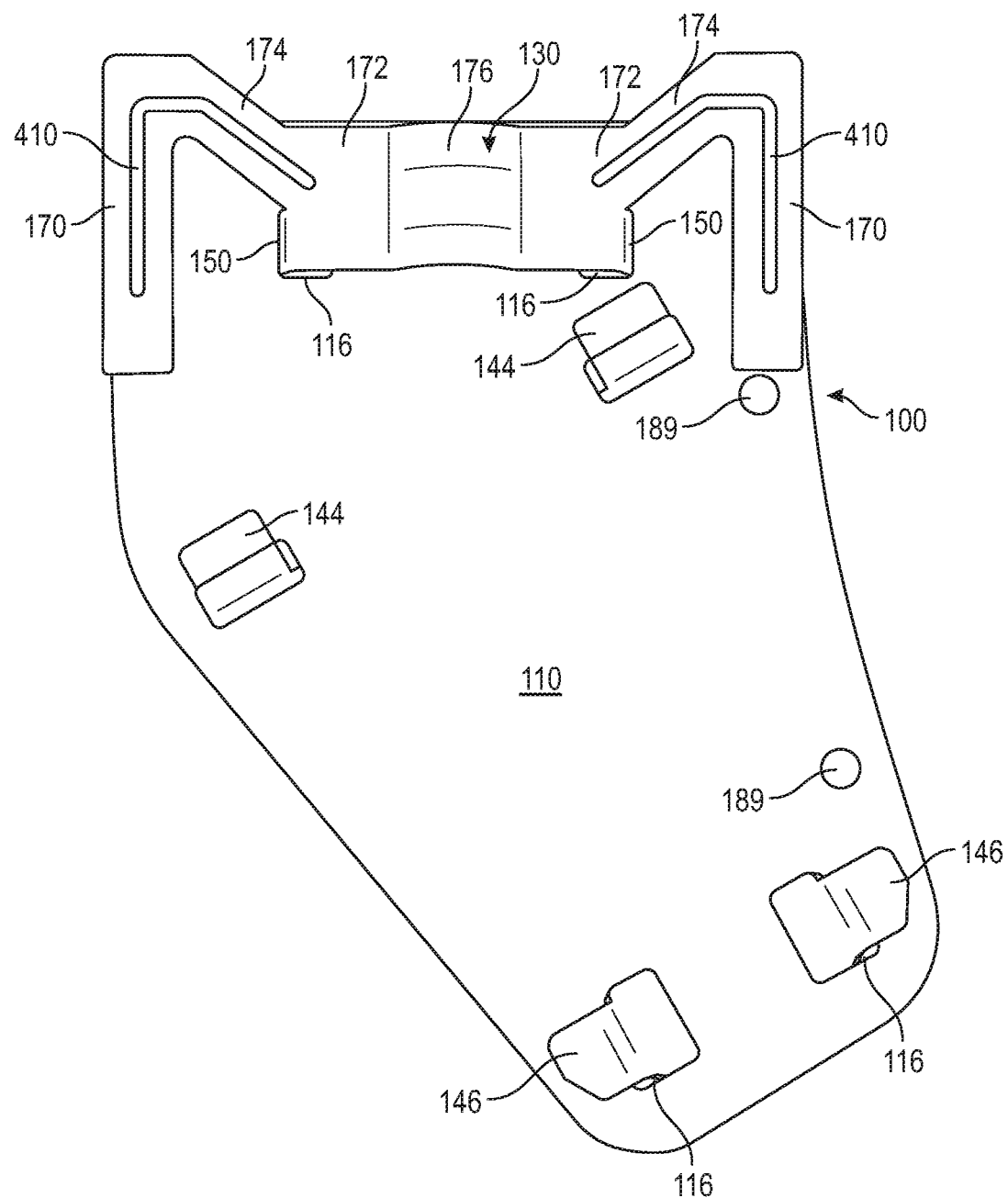
FIG. 4 is a rear (user-facing) view of the assembled holster arrangement of FIG. 2.
Figure 5:
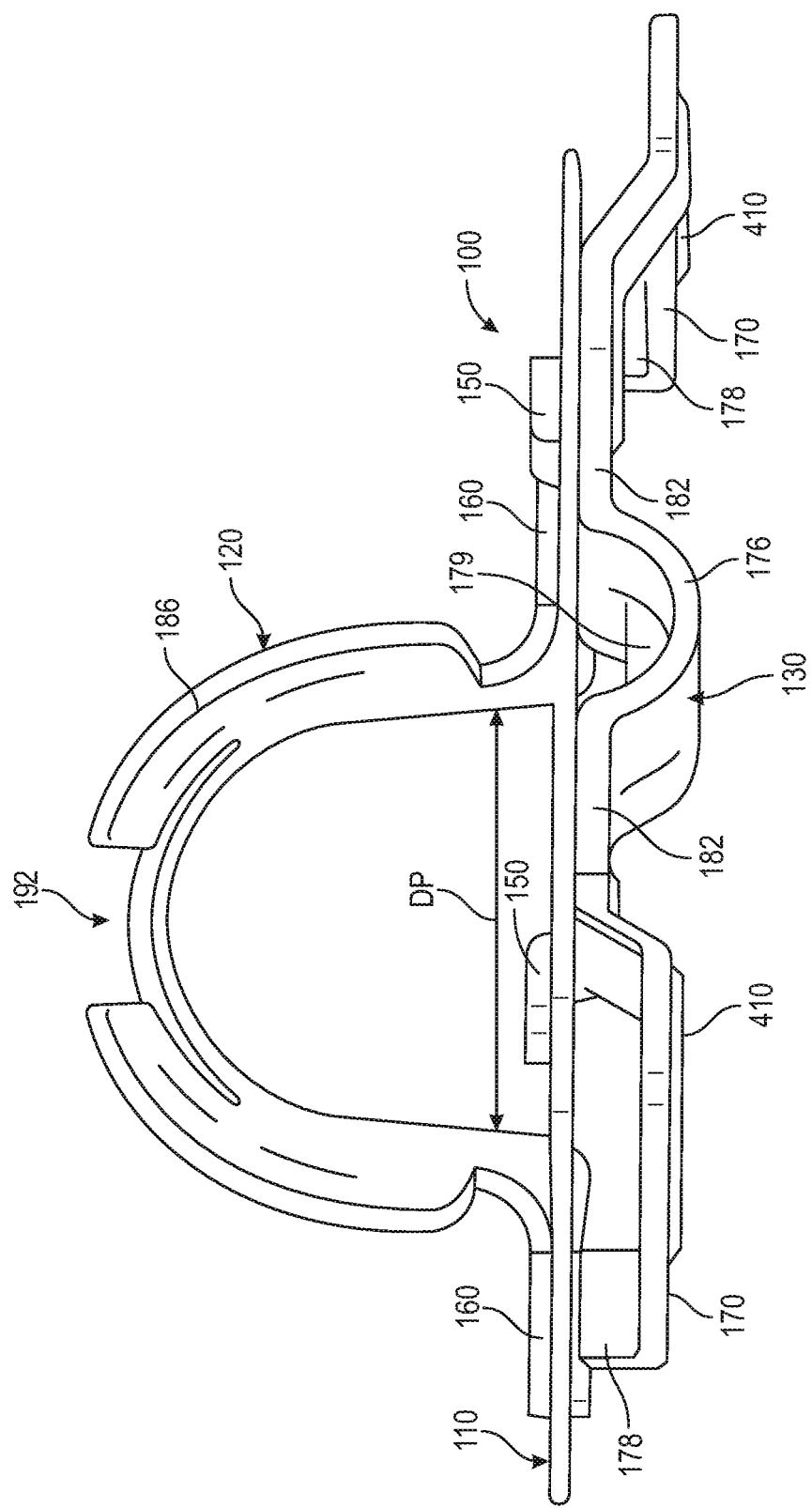
FIG. 5 is a top view of the assembled holster arrangement of FIG. 2.
Figure 6:
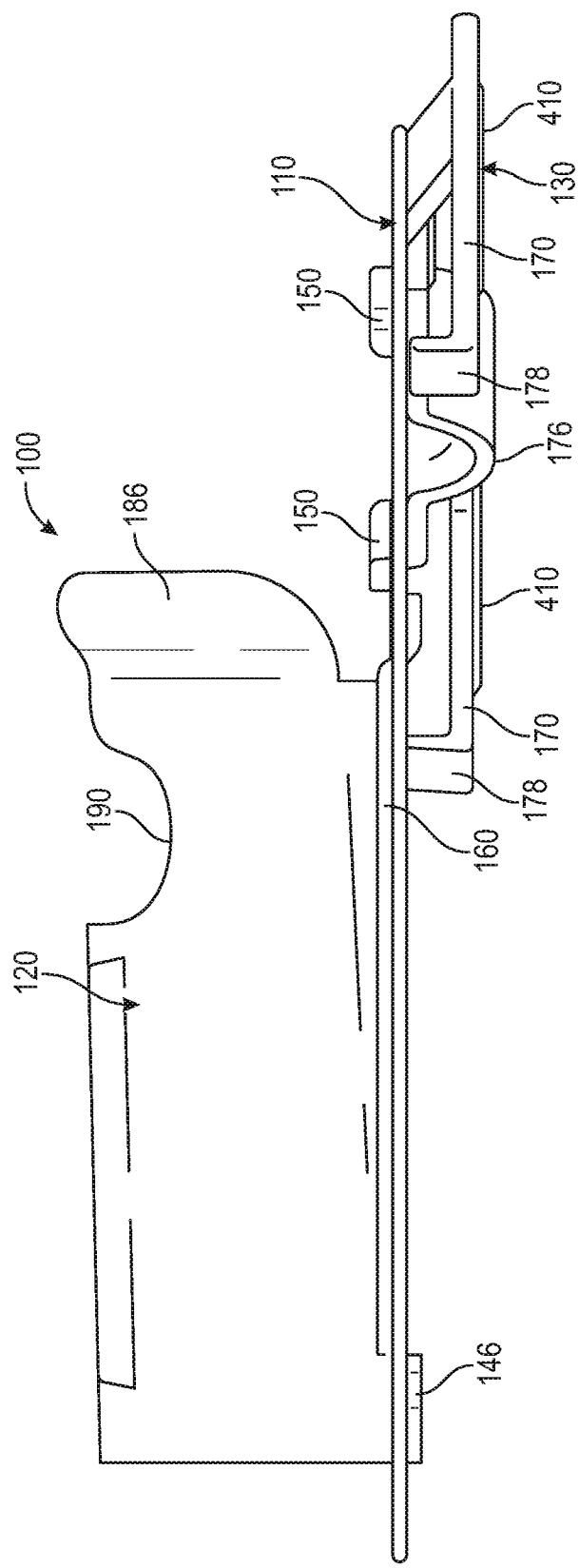
FIGS. 6 and 7 are each of opposing side views of the assembled holster arrangement of FIG. 2.
Figure 7:
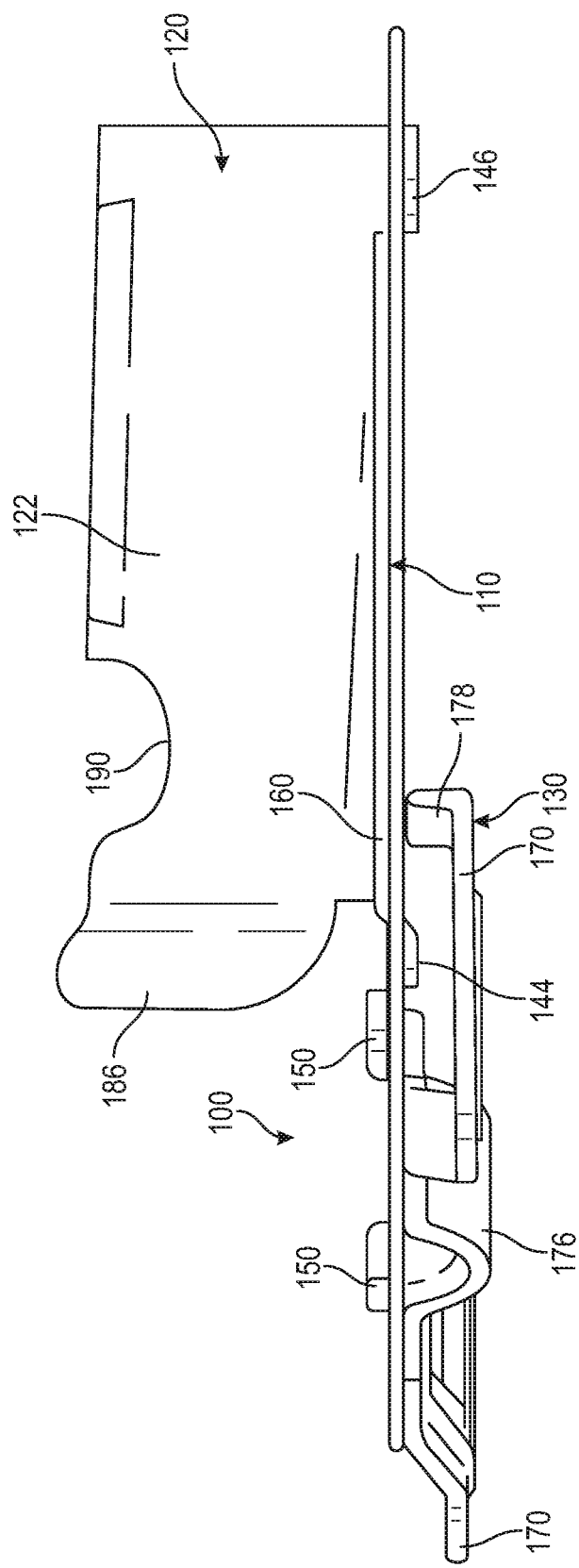
Figure 8:
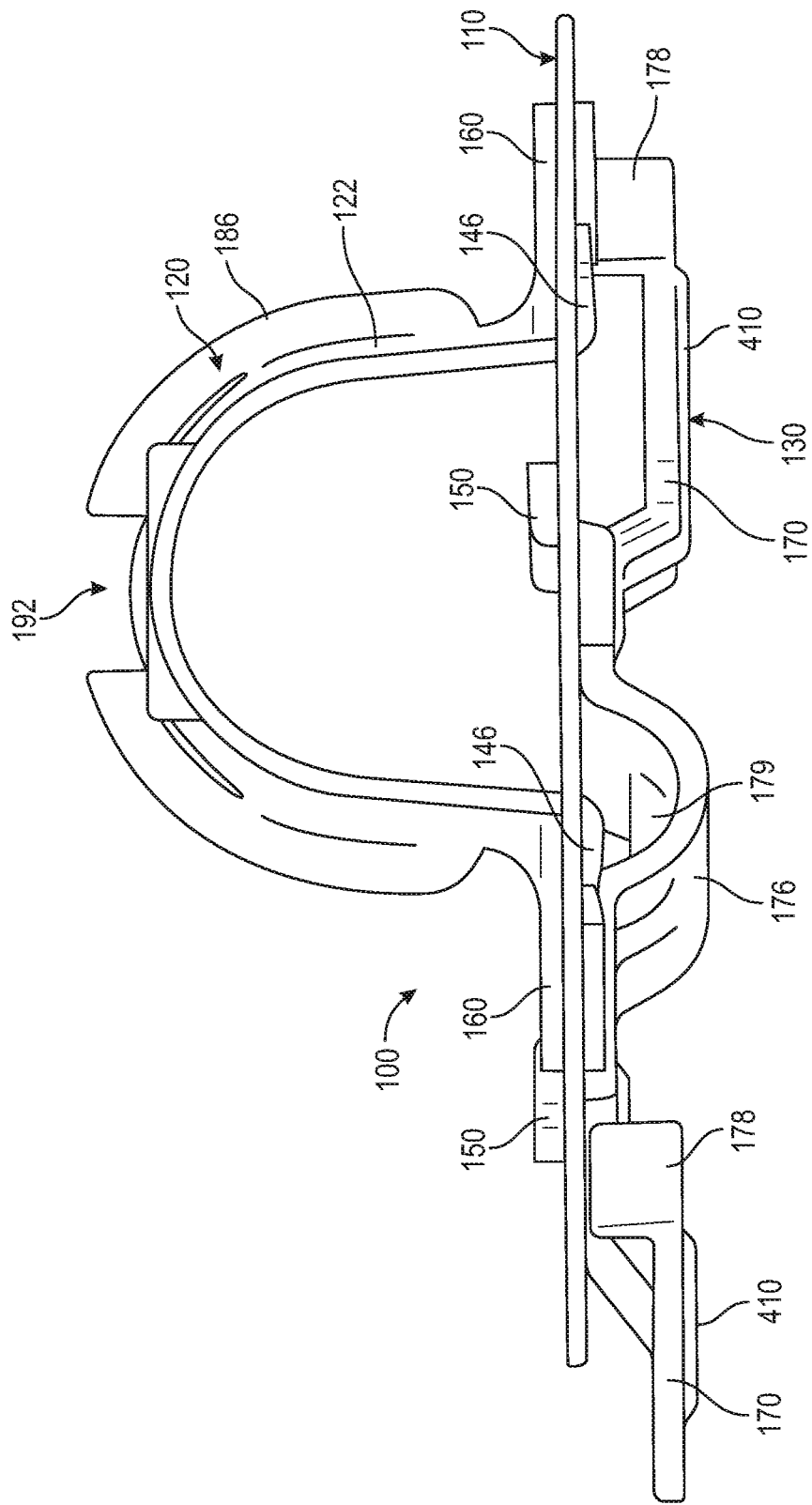
FIG. 8 is a bottom view of the assembled holster arrangement of FIG. 2.

Likewise, the uppermost slots 116 of the backing plate 110 removably receive oppositely directed tabs 150 on the top end of the belt clip assembly 130. The clip assembly 130 includes a pair of opposing belt retainers 170 that are sized to engage a standard width pant belt 210 (shown in phantom in FIGS. 2 and 2A). The retainers 170 can include strengthening ribs 410, molded unitarily into the rear thereof. The ribs 410, as shown in FIG. 4, extend vertically along the belt engaging, cantilevered belt slide-through portion of each retainer 170 and also along downwardly angled side wings 174 to a position on the central base 172 of the clip assembly 130. Each vertical, belt slide-through portion of the retainer 170 includes a unitary lower flange 178 that is directed forwardly (e.g. away from the wearer so as to capture the lower edge 220 of the belt 210 (FIGS. 2 and 2A) as the holster arrangement 100 is worn by a user.

The belt clip assembly 130 can be attached or removed for the users belt by flexing the slid-through portions to disengage the flanges 178 while sliding the holster upwardly out of the waistband area of the user's pants (not shown), and/or by manipulating the holster 100 relative to a loosened/slack belt to unhook the flanges 178 therefrom. The clip assembly 130 also includes a unitary, semi-cylindrical, raised finger socket area 176 that allows for elastic deflection of the clip assembly about the area 176, in response to a pinching action, to move the tabs 150 toward each other. This allows for the tabs 150 to be engaged into, and disengaged from, respective base plate slots 116 in a manner described generally above with respect to the holder 120. Hence, the semi-cylindrical area acts as a retention spring for the clip assembly 130 relative to the base plate 110. A unitary, flex and warp limiter bridge 179 is located on the front (concave) side of the semi-cylindrical area 176, which prevents plastic deformation of the area when pinched, and provides enhanced spring compliance to assist in retaining the belt clip assembly 130 in positive engagement with the backing plate 110. In engagement, the flats 182 on each side of the semi-cylindrical area 172 conform to the surface of the backing plate when the taps 150 are engaged in the slots 116, thereby ensuring a firm and rattle-free construction.

The belt clip assembly 130 has an overall width of between approximately 4¾ and 5¼ inches, and more particularly approximately 5 inches. The vertical slide-through portions of the retainers 170 are approximately 1¼ inches in height, but can be smaller or larger where the user employs a particular, belt size. The vertical side portions have a width of approximately ¼-½ inch.

Figure 2:
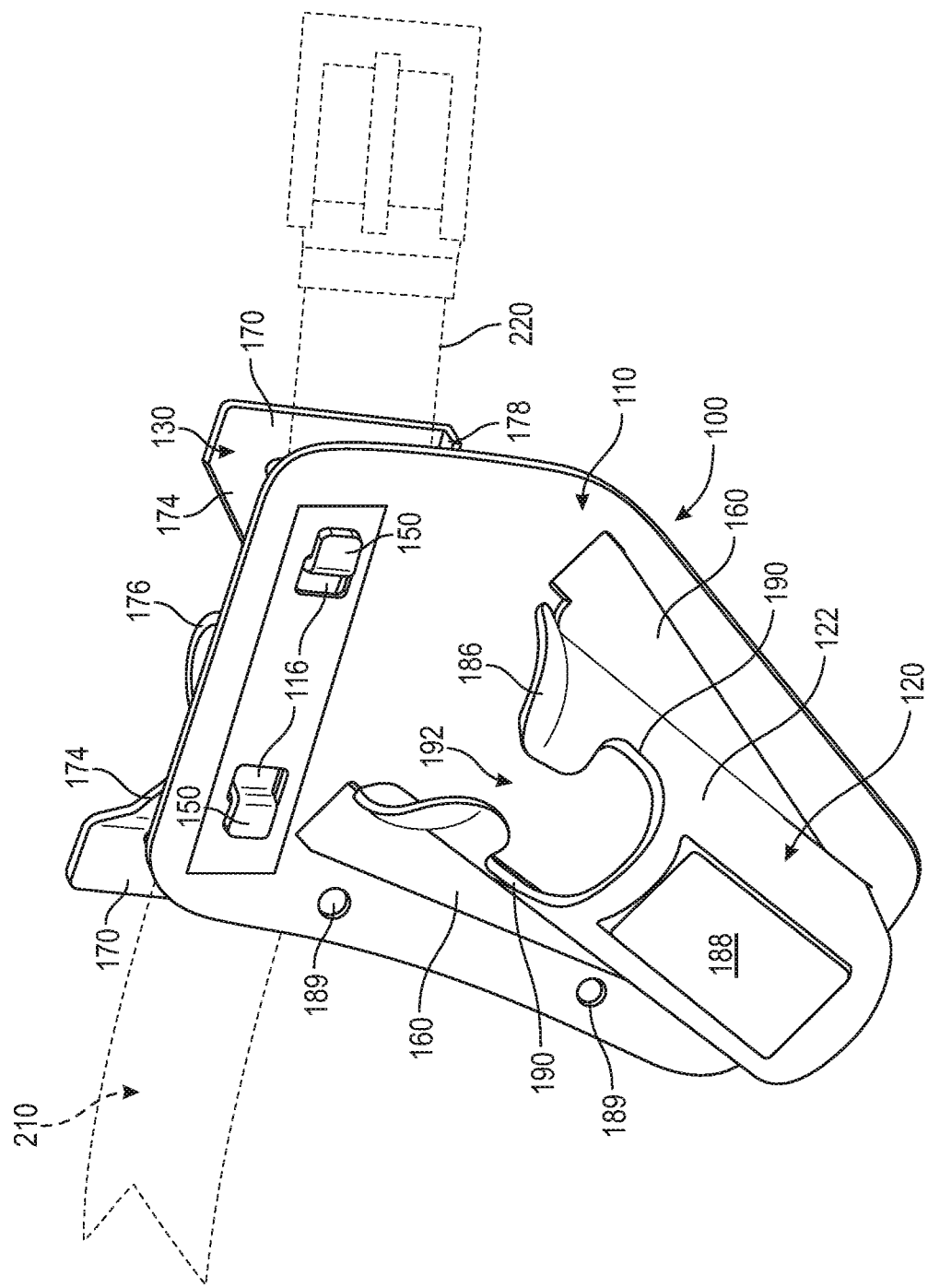
FIG. 2 is a perspective view showing the holster arrangement of FIG. 1, in assembled form, mounted on an exemplary belt for wearing with respect to the right hip.
Figure 2A:
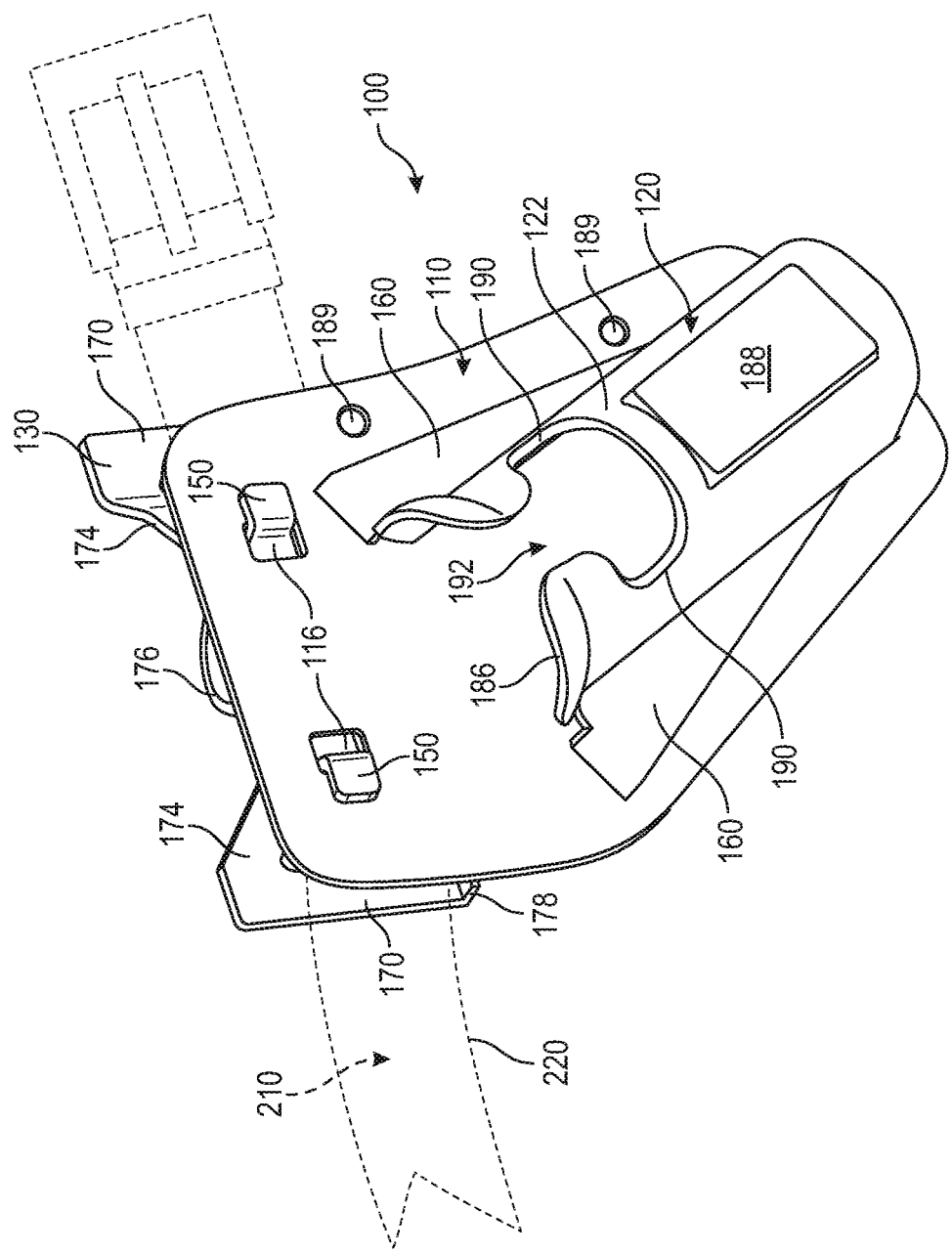
FIG. 2A is a perspective view showing the holster arrangement of FIG. 1, in assembled form, mounted on an exemplary belt for wearing with respect to the left hip.
Figure 3:
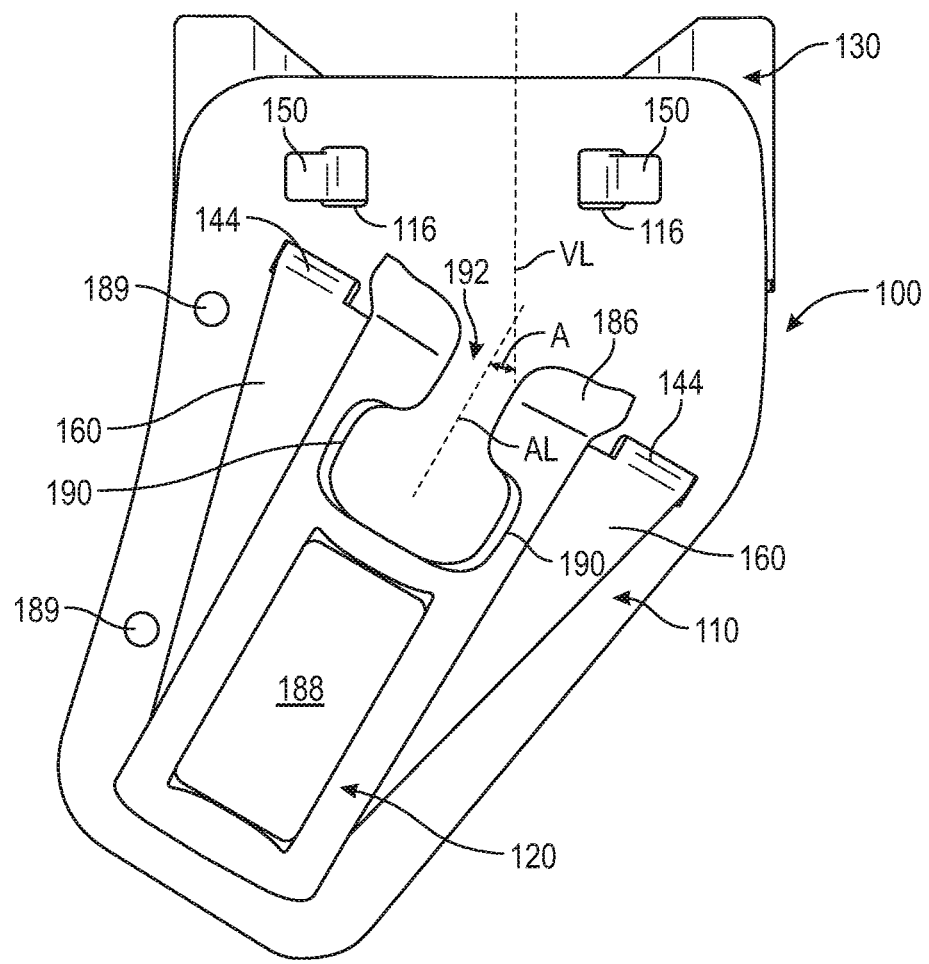
FIG. 3 is a front view of the assembled holster arrangement of FIG. 2.

Notably, the removable rod holder 120 and belt clip assembly 130 are readily exchangeable on each side of the backing plate 110 providing for an ambidextrous rod holder 100 that can be worn on either the user's right hip (as arranged in FIG. 2) or left hip (as arranged in FIG. 2A). Hence, the rod holster 100 herein can accommodate users who prefer left-handed, right-handed or cross-handed access to the fishing rod. In both orientations, the rod rests in the holster at an acute forward angle A (FIG. 3, described above), relative to the vertical VL. This forward angle generally prevents the rod from striking or interfering with the user's hear or torso when the rod is not in use and the user is in a normal standing position. Advantageously, the holster arrangement 100 operates as a third hand that allows the user free use of both hands while the rod is inserted in the holster.

Figure 9:
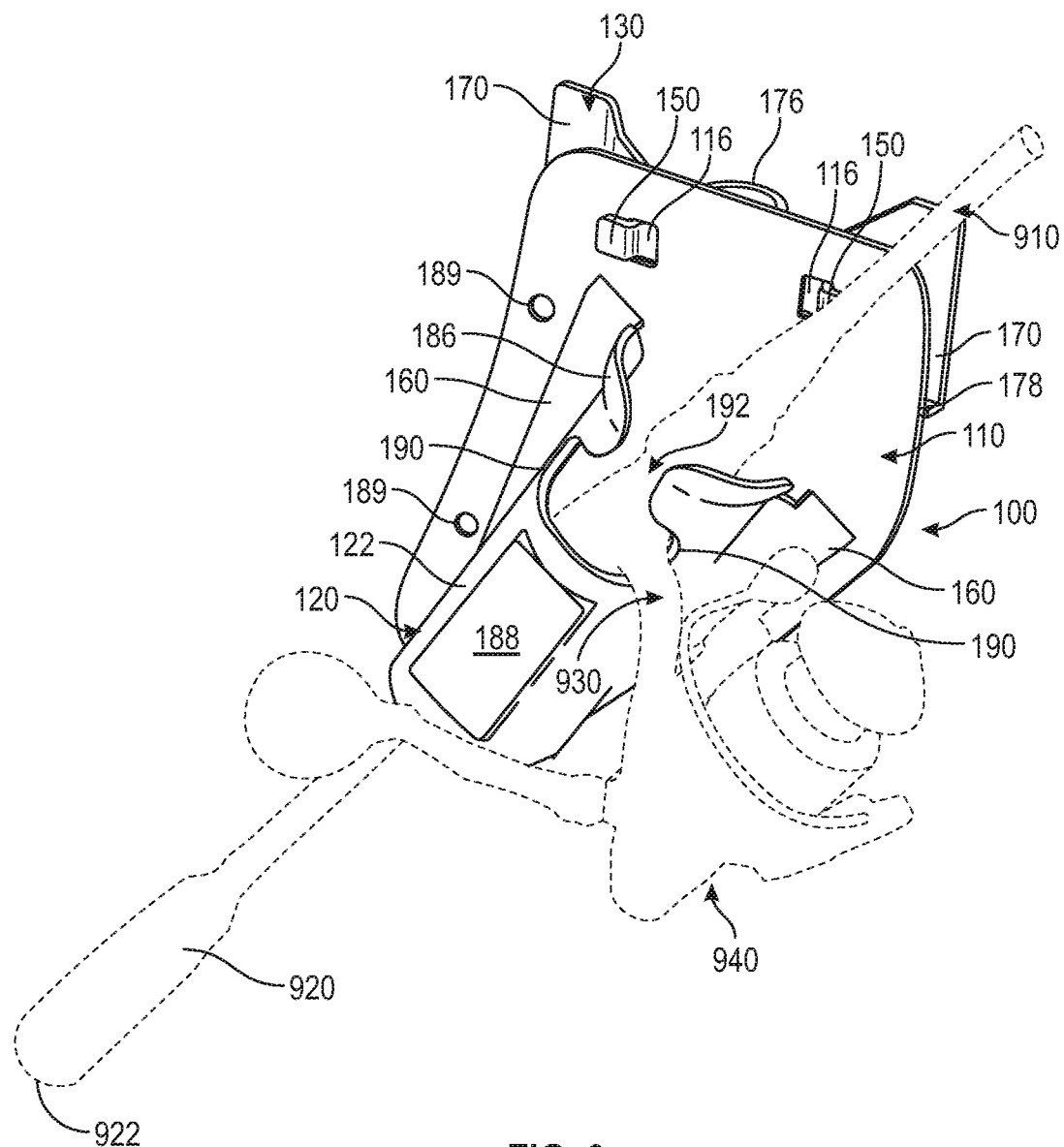
FIG. 9 is a perspective view of the assembled holster arrangement of FIG. 2 shown with an exemplary fishing rod, and associated spinning reel, mounted in a locked orientation therein.
Figure 10:
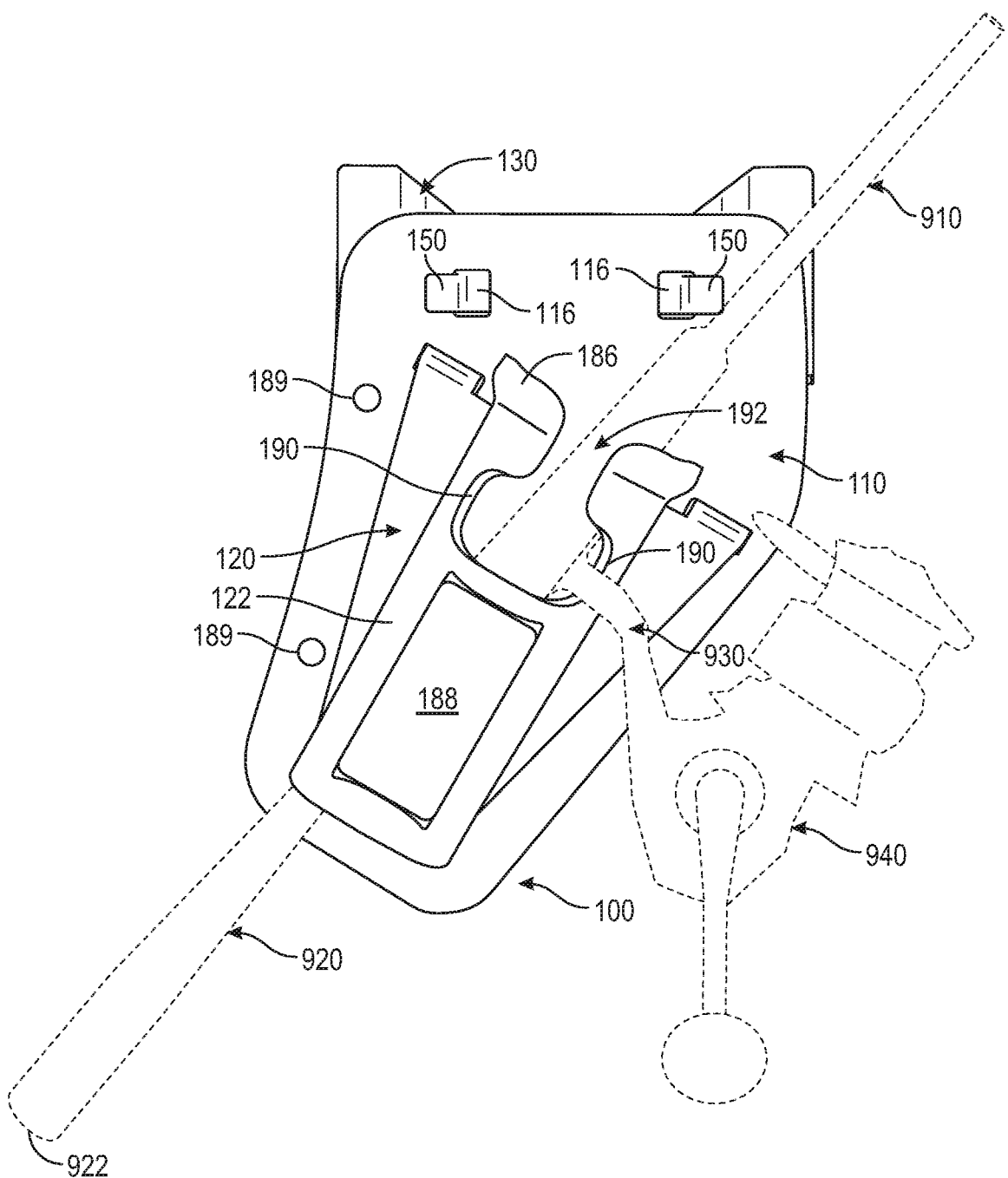
FIG. 10 is a side view of the assembled holster arrangement and fishing rod/reel of FIG. 9.
Figure 11:
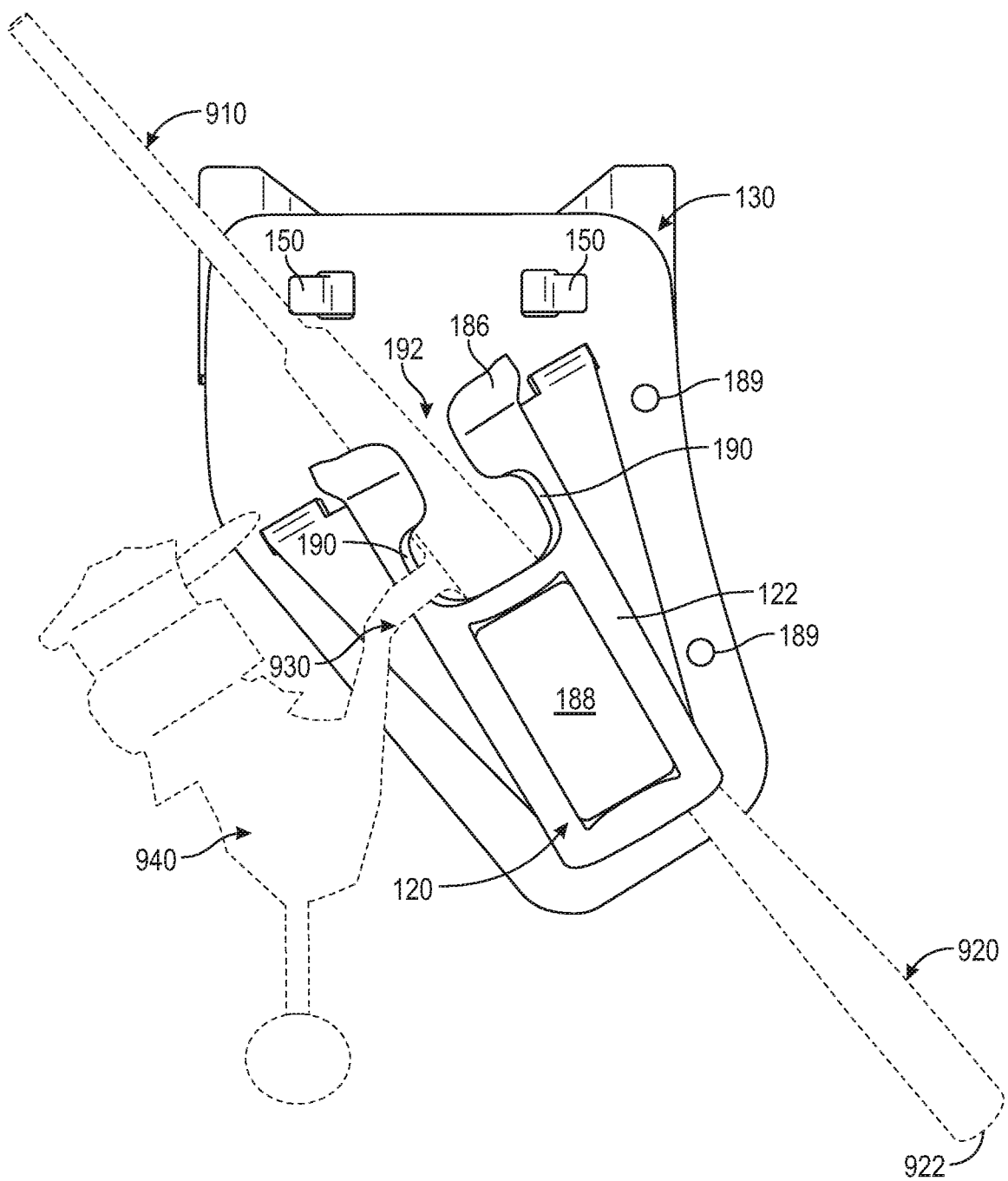
FIG. 11 is a side view of the assembled holster arrangement with an exemplary fishing rod, and associated spinning reel, mounted in a locked orientation for wearing on the left hip as shown in FIG. 2A.

The inner diameter DP (FIG. 5) of the semi-cylindrical pipe 122 is highly variable. In an exemplary embodiment it is sufficient to receive (and allow to pass through) a handle 910 of a conventional fresh water fishing rod 920 (shown in phantom) as shown in FIGS. 9, 10 and 11. The inner pipe diameter DP can be between approximately 1 and 1¾ inches in various embodiments, and is more particularly 1½ inches. The maximum top width of the holder (between the outside corners of each wedge-shaped flange 160) is approximately 3¾-4 inches. The top of the holder 120 includes a unitary flanged rod guide 186 that flares outwardly in an upward direction and provides a funnel top to assist in guiding the end (922 in FIG. 9) of the rod handle 920 into the holder. An optional branding plate 188 for printing/adhesion/attachment and/or molding-in of a logo, monogram or other decoration/indicia can be formed on the front surface of the holder 120. The overall height of the holder 120 is approximately 5-6 inches.

The backing plate also includes (e.g.) two accessory mounting holes 189 of appropriate diameter (e.g. ⅛-¼ inch) along an edge that is generally opposite the direction of projection of the rod. These holes 189 can be used to attach fasteners-such as screws, rivets, snaps, etc., which allow the holster to carry a sidecar sheath for an accessory, such as a knife or plier, a small bat holder, fly holder, and the like.

Notably the ambidextrous construction of the holster arrangement allows for certain types of fishing reels to be locked in place. A pair opposing detents 190 are formed below a top keyway slot 192 locking mechanism in the pipe 122. As shown in FIGS. 9-11, the slot 192 is of sufficient width (e.g. approximately ½-¾ inch) to allow the shaft of the foot assembly 930 of a typical spinning reel 940 (both shown in phantom) to pass through as the rod handle 920 is placed in the pipe 122 of the holder 120. Once passed through the slot, the weight of the reel 940 causes the foot assembly shaft 930 to rotate into, and be retained by, one of the detents 190. This engagement between the foot shaft 930 and detent 190 serves to interfere with upward withdrawal of the rod 910 until the user positively rotates it to align the shaft 930 with slot 192, and then the rod 910 can be removed from the holster for use. Note that the presence of two opposing detents 190 ensures that the reel will be locked in either a right-hip (FIGS. 9 and 10) or left-hip (FIG. 11) arrangement.

In the case of reels that lack a foot assembly with a shaft (e.g. spincasting and baitcasting reels—not shown), the reel is not actually locked, but simply rests by gravity against top of the flared flange 186 of the pipe 122 after the handle is passed through the holder 120.

The components 110, 120 and 130 of the modular holster arrangement 100 can be constructed of, for example an injection-molded polymer, such as polypropylene. Other polymers (e.g. PVC, PET, HDPE, etc.) and/or composites (e.g. fiberglass, carbon fiber, glass-filled nylon, etc.) can be employed for some or all the components. For example, the belt clip assembly 130 (or portions thereof) can be constructed from a differing/dissimilar material, such as HDPE so as to provide specific performance and durability characteristics. Alternate formation techniques, such as 3D printing, vacuum forming, sheet-cutting, extrusion and/or blow molding can be employed for some or all of the components, or portions thereof. Also, while each of the three components is formed as a single, unitary structure, in alternate embodiments, some components can be integrated from separate pieces in the same, or dissimilar, material(s). Likewise some components—for example, the backing plate—can be constructed from a metal, such as aluminum alloy. Additionally, in alternate embodiments, traditional holster materials (e.g. leather) and/or metal components, such as coil springs can be incorporated into the construction for structural and/or decorative reasons. Additionally, while the backing plate defines a partially angled, dogleg outline, it can have any acceptable shape that allows for ambidextrous mounting of the holder and clip as described herein.

It should be clear that the above-described modular fishing rod holster provides a versatile and useful addition to a fisherman's equipment. The all-polymer construction of the illustrative embodiment allows the holster arrangement to be typically free of natural materials (e.g. leather), metal fasteners and stitching, so as to avoid fraying, rot or oxidation/rusting, while providing a long-lived, durable, waterproof and mar-free holster. It can be used with variety of pole and reel types (e.g. freshwater and many saltwater poles), and provides for secure locking of some of the most popular pole and reel combinations. Also, by employing three sturdy components, assembly of the holster in either right or left orientation is relatively straightforward, and the chance of loss or breakage of a key element is greatly reduced.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A method for reversing a wear direction of a modular holster for a fishing rod, the holster comprising, a backing plate having a plurality of slots in a predetermined arrangement, the backing plate having a first face and an opposing second face, a rod holder with an open top and bottom that allows the fishing rod handle to pass therethrough, a belt clip assembly that includes belt engaging portions that allow removable attachment to a user's belt, and a plurality of tabs on each of the rod holder and the belt clip assembly that springingly engage to, and disengage from, respective of the slots so that (a) the rod holder can be removably attached to the first face at a non-vertical, forward-facing angle while the belt clip assembly is removably attached to the second face or (b) the rod holder can be removably attached to the second face at a non-vertical, forward-facing angle while the belt clip assembly is removably attached to the first face, the method comprising the steps of;

removing the plurality of tabs on each of the rod holder and the belt clip assembly from each of the plurality of slots on the backing plate relative to a first face of the backing plate, respectively, reversing a facing direction of the backing plate, and attaching the plurality of tabs on each of the rod holder and the belt clip assembly from each of the plurality of slots on the backing plate relative to a second face of the backing plate, opposite the first face, respectively.

2. The method as set forth in claim 1 wherein the open top includes a keyway with opposing detents that allow a spinning wheel foot assembly shaft to lock thereinto based upon rotation of the fishing rod relative to the holder.

3. The method as set forth in claim 1, further comprising, constructing the holder and the belt clip assembly from an elastically deformable polymer.

4. The method as set forth in claim 3, further comprising, constructing the backing plate from a polymer.

5. The method as set forth in claim 4, wherein the polymer is injection-molded polypropylene.

6. The method as set forth in claim 5, further constructing the belt clip from HDPE.

7. The method as set forth in claim 1, wherein the holder defines a semi-cylindrical shape.

8. The method as set forth in claim 7, wherein the holder includes opposing flattened flanges that engage the backing plate and each carry one of the plurality of tabs.

9. The method as set forth in claim 8, wherein the holder includes a flared guide flange at a top end thereof.

10. The method as set forth in claim 8, wherein each tab of the plurality of tabs on the flattened flanges face upwardly and two bottom tabs of the plurality of the tabs are located adjacent to a bottom end of the holder and face in opposing directions, and further comprising, pinching the holder to elastically deform, and thereby to move, the bottom tabs toward each other.

11. The method as set forth in claim 1, wherein the backing plate includes holes for mounting accessories thereon.

12. The as set forth in claim 1, wherein the belt clip assembly includes a finger grip structure, and further comprising, pinching the finger grip structure to cause elastic deformation that moves opposing tabs toward each other.

13. The method as set forth in claim 12, wherein the finger grip structure defines a semi-cylindrical structure between flattened bases arranged to engage the backing plate, wherein the bases have each of a plurality of tabs mounted thereon.

14. The method as set forth in claim 13, wherein the flattened bases have, extending therefrom, the belt engaging portions, oriented vertically downward and including flanges for engaging a lower edge of a belt.

15. The method as set forth in claim 1, wherein each of the steps of removing and attaching comprise elastically deforming the plurality of tabs on each of the rod holder and the belt clip assembly to move between an interfering and non-interfering orientation with respect to the plurality of slots, respectively.

* * * * *